(12) United States Patent
Pucci et al.

(10) Patent No.: US 12,116,176 B2
(45) Date of Patent: Oct. 15, 2024

(54) CAP FOR A CONTAINER AND RELATED PRODUCTION METHOD

(71) Applicant: SACMI COOPERATIVA MECCANICI IMOLA SOCIETA' COOPERATIVA, Imola (IT)

(72) Inventors: Fabrizio Pucci, Castel Guelfo di Bologna (IT); Fiorenzo Parrinello, Medicina (IT); Giovanni Mazzotti, Ravenna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 17/390,306

(22) Filed: Jul. 30, 2021

(65) Prior Publication Data
US 2022/0041340 A1    Feb. 10, 2022

(30) Foreign Application Priority Data
Aug. 6, 2020    (IT) .......................... 102020000019534

(51) Int. Cl.
*B65D 41/34* (2006.01)
*B29D 99/00* (2010.01)
(Continued)

(52) U.S. Cl.
CPC ..... *B65D 41/3428* (2013.01); *B29D 99/0096* (2013.01); *B29K 2001/00* (2013.01); *B29K 2105/06* (2013.01)

(58) Field of Classification Search
CPC ............ B65D 41/3423; B65D 41/3428; B65D 41/3442; B65D 41/3447; B65D 41/348; B65D 41/3485; B65D 41/3404; B65D 41/3409; B65D 41/3495; B65D 41/36; B65D 41/04; B65D 41/0414; B65D 41/0471; B65D 41/06; B65D 41/32;
(Continued)

(56) References Cited

U.S. PATENT DOCUMENTS 1,548,459 A * 8/1925 Hammer ................ B65D 41/04
                                              215/333
2,104,236 A * 1/1938 Mermer ............ B65D 41/3404
                                              215/252
(Continued)

FOREIGN PATENT DOCUMENTS

GB                607700 A        9/1948

*Primary Examiner* — J. Gregory Pickett
*Assistant Examiner* — Brijesh V. Patel
(74) *Attorney, Agent, or Firm* — PEARNE & GORDON LLP

(57) ABSTRACT

A cap for a container is made of a material at least part of which is derived from natural fibres. The cap comprises a cup-shaped body having a skirt which extends around an axis and a transversal wall arranged transversally to the axis. A cavity is defined inside the cup-shaped body. The cup-shaped body is delimited by an inner surface facing the cavity and by an outer surface facing the opposite way to the cavity. At least one projecting element projects from a surface of the cup-shaped body selected from either the inner surface or the outer surface. At least one recess is provided at the projecting element on another surface of the cup-shaped body selected from either the outer surface or the inner surface.

18 Claims, 5 Drawing Sheets

(51) Int. Cl.
 *B29K 1/00* (2006.01)
 *B29K 105/06* (2006.01)

(58) Field of Classification Search
 CPC .. B65D 41/48; B65D 41/325; B65D 43/0204;
  B65D 45/322; B65D 65/466; B65D
  55/00; B65D 2251/06; B65D 2543/00268;
  B65D 2543/00287; B65D 2543/00296;
  B29D 99/0096; B29K 2001/00; B29K
  2105/06
 USPC .............. 220/840, 288, 293, 789, 796, 801;
  215/235, 237, 252–253, 256, 222, 246,
  215/250, 324, 330–333; 222/556, 546,
  222/153.07
 See application file for complete search history.

(56) References Cited

U.S. PATENT DOCUMENTS

| | | | | |
|---|---|---|---|---|
| 2,134,178 A * | 10/1938 | Esposito | ............ | B65D 41/3404 215/252 |
| 2,168,321 A * | 8/1939 | Burrell | ................. | B65D 41/348 215/252 |
| 2,214,255 A * | 9/1940 | Miner | ................. | B65D 41/348 215/252 |
| 2,382,873 A * | 8/1945 | Goodwin | ............ | B65D 41/0457 425/398 |
| 2,398,553 A | 4/1946 | Robert | | |
| 2,423,582 A * | 7/1947 | Coleman | ............ | B65D 41/3404 215/330 |
| 3,235,115 A * | 2/1966 | Duke | ................. | B65D 41/3409 215/252 |
| 3,314,564 A * | 4/1967 | Andersen | ............. | B65D 41/348 215/252 |
| 3,489,307 A * | 1/1970 | Wenger | ................. | B65D 41/045 215/337 |
| 3,692,200 A * | 9/1972 | Ritzenhoff | ............. | B65D 41/32 215/337 |
| 3,743,128 A * | 7/1973 | Childs | ..................... | B29C 51/34 215/337 |
| 3,773,205 A * | 11/1973 | Keeler | ................. | B29C 66/8322 53/DIG. 2 |
| 3,788,509 A * | 1/1974 | Keeler | ................. | B65D 41/348 215/324 |
| 3,904,061 A * | 9/1975 | Keeler | ............... | B65D 41/0414 215/252 |
| 4,153,174 A * | 5/1979 | Keeler | ............... | B65D 41/3423 215/250 |
| 4,209,101 A * | 6/1980 | Brown | ............... | B65D 41/3404 215/253 |
| 4,225,050 A * | 9/1980 | Reinhart | ............ | B65D 41/3409 264/156 |
| 4,337,870 A * | 7/1982 | Keeler | ............... | B65D 41/3409 264/156 |
| 4,361,457 A * | 11/1982 | Keeler | ................. | B65D 41/045 264/494 |
| 4,423,820 A * | 1/1984 | Vangor | .............. | B65D 41/3409 264/156 |
| 4,700,860 A * | 10/1987 | Li | .......................... | B65D 41/48 215/256 |
| 5,320,233 A * | 6/1994 | Welch | .................... | B65D 41/36 220/301 |
| 8,701,905 B2 | 4/2014 | Warner | | |
| 9,452,863 B2 | 9/2016 | Dayton et al. | | |
| 2009/0283526 A1* | 11/2009 | Pierce | ................. | B65D 43/022 220/789 |
| 2010/0155396 A1 | 6/2010 | Warner | | |
| 2014/0291273 A1 | 10/2014 | Warner | | |
| 2016/0029824 A1* | 2/2016 | Yiu | ........................ | B65D 43/14 220/254.1 |
| 2020/0062475 A1 | 2/2020 | Warner | | |

\* cited by examiner

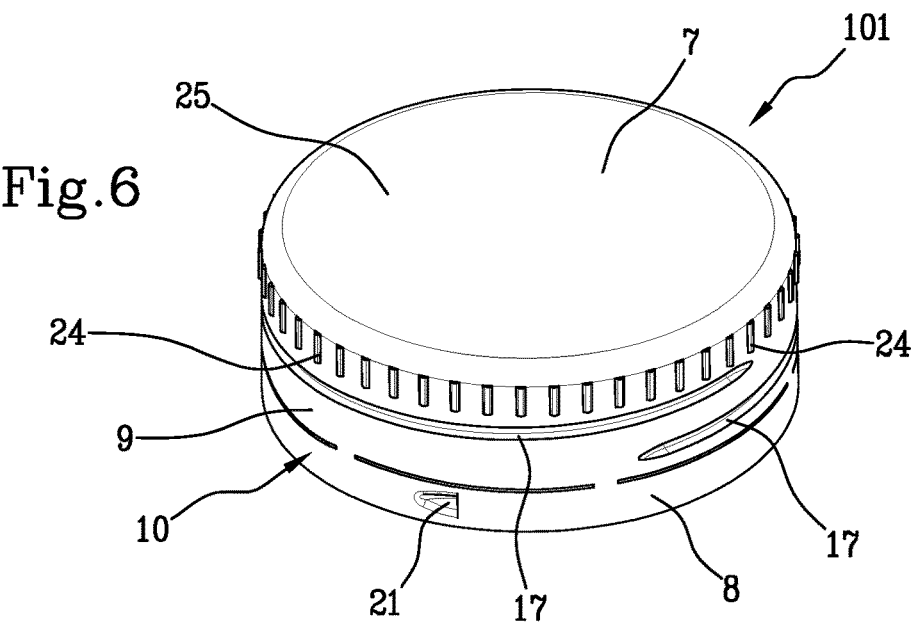
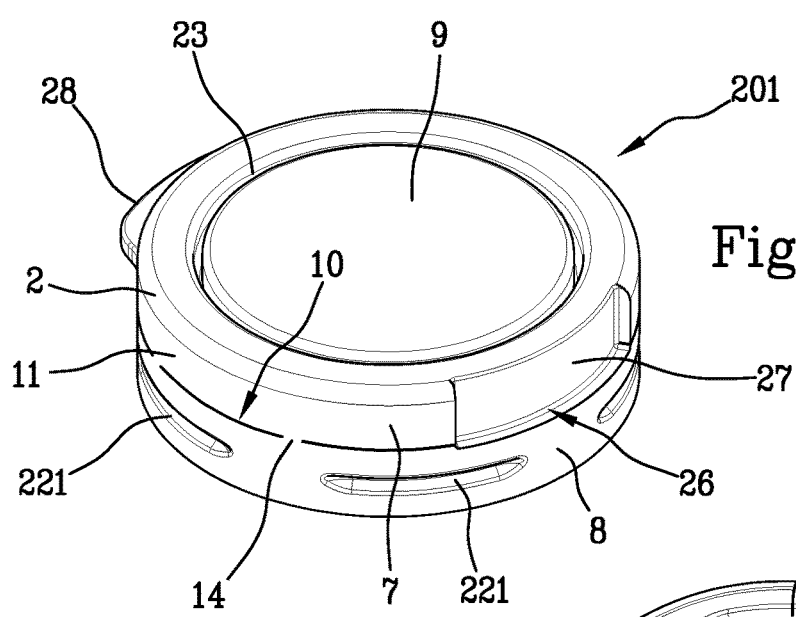
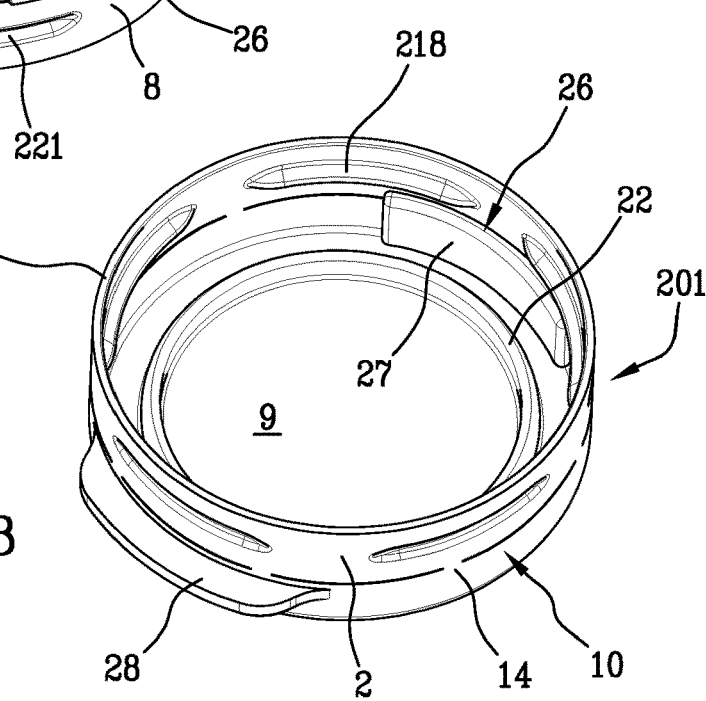

CAP FOR A CONTAINER AND RELATED PRODUCTION METHOD

The invention relates to a cap for a container made of a material at least part of which is derived from natural fibres, for example a material comprising cellulose.

The cap according to the invention is intended to be used for closing containers such as bottles, jars, pots or the like.

The invention also relates to a method for producing a cap for a container. For reasons linked to environmental protection, the use of natural and renewable materials is desirable, for example cellulose-based materials, for producing packaging components, such as caps for containers. In fact, such materials are much less polluting and easier to dispose of than synthetic polymers which are currently widely used in the packaging sector.

Materials derived from natural fibres such as cellulose-based materials may be used for producing objects by moulding. In this case, the material deriving from natural fibres, for example in the form of powder or in a pasty form, is positioned in a mould with a very low initial density and needs to be pressed with a high degree of compaction to provide a good quality object.

Materials deriving from natural fibres flow with difficulty inside the mould and in particular do not flow uniformly between a female part and a male part of the mould. Therefore, it is appropriate to introduce these materials into the mould in such a way that these materials, already at the moment when they are inserted between the female part and the male part, occupy the whole space available between the female part and the male part, which is not easy. The situation becomes complex when the materials of the type described above are used for producing objects having zones whose thicknesses differ from each other. In that case, there may be a lack of uniformity in the density of the material deriving from natural fibres within the finished product. In particular, the thicker portions of the object may have a lower density than the thinner portions of the object. That is linked to the difficulties encountered in compacting the material deriving from natural fibres with a constant degree of compaction, irrespective of the local thickness of the object to be produced.

This disadvantage is particularly evident in the case in which one wants to use a material deriving from natural fibres for making caps. In fact, the caps often have considerable differences in thickness between one zone and another. For example, many caps comprise, on an inner surface of their lateral wall, one or more threads which project inwards towards the inside the cap. At the threads, the lateral wall is thicker than it is in the zones in which the threads are not present.

The variations in density in the cap may cause variations in the mechanical strength of the zones involved, with subsequent risks of breakage or excessive deformation in the less compacted zones.

An object of the invention is to improve caps for containers, in particular caps made of a material at least part of which is derived from natural fibres, such as cellulose, as well as the related production methods.

A further object is to provide a cap for a container made of a material at least part of which is derived from natural fibres, which has a substantially uniform density.

Another object is to provide a cap for a container made of a material at least part of which is derived from natural fibres, which has mechanical properties which are as far as possible constant in different zones of the cap.

In to a first aspect of the invention, a cap for a container is provided, the cap being made of a material at least part of which is derived from natural fibres, the cap comprising a cup-shaped body having a skirt which extends around an axis and a transversal wall arranged transversally to the axis, a cavity being defined inside the cup-shaped body, the cup-shaped body being delimited by an inner surface facing the cavity and by an outer surface facing the opposite way to the cavity, wherein at least one projecting element projects from a surface of the cup-shaped body selected from either the inner surface or the outer surface, and wherein at least one recess is provided at said at least one projecting element on another surface of the cup-shaped body selected from either the outer surface or the inner surface.

By providing a recess at the projecting element, the thickness of the cup-shaped body at the projecting element will be less than it would be if the recess were not present. By suitably dimensioning the recess, it is possible to ensure that the thickness of the cup-shaped body does not vary excessively between the projecting element and the zones adjacent to it, that is to say, the thickness has reduced variability between different zones of the cap or is even substantially constant.

That is helpful when uniformly compacting the material at least part of which is derived from natural fibres, which forms the cap. Consequently, it is easier to obtain a cap which has a uniform density, and consequently mechanical properties which do not vary significantly between different zones of the cap.

The cap according to the first aspect of the invention has an outer three-dimensional profile which as far as possible copies the inner three-dimensional profile. That makes it possible to compact the material of which the cap is constituted with a uniform degree of compaction, avoiding the presence in the cap of zones having a density that is too low. In other words, in the cap according to the first aspect of the invention the density is maximised substantially in the whole cup-shaped body, depending on the compaction technology used.

In one embodiment, the projecting element is a fastening element which projects from the skirt inwards towards the inside of the cup-shaped body, that is to say, towards the cavity.

The fastening element allows the cap or part of it to be removably fixed to a neck of the container, so that the cap can be applied to the neck of the container and then removed from the latter.

The fastening element may be a screw thread, suitable for engaging with a corresponding screw thread made on the neck of the container.

Providing a recess on the outer surface of the cup-shaped body at the fastening element avoids having a thickening of the cup-shaped body in the region in which the fastening element is located. In this way, the density of the material which constitutes the cap does not vary excessively between the region in which the fastening element is located and adjacent regions.

In one embodiment, provided on the skirt is an intended separating line which on the cup-shaped body defines a closing element and an annular band.

The annular band is intended to remain anchored to a neck of the container.

The closing element is intended to be separated from the annular band along the intended separating line to open the container to which the cap is applied.

The closing element comprises a lateral wall which extends between the intended separating line and the transversal wall.

In one embodiment, the projecting element is an engaging element which projects from the annular band inwards towards the inside of the cup-shaped body, to engage with a retaining element provided on the neck of the container.

The retaining element, engaging with the engaging element, obstructs removal of the annular band from the neck of the container.

Providing a recess on the outer surface of the cup-shaped body at the engaging element avoids having a thickening of the cup-shaped body in the region in which the engaging element is located. In this way, the density of the material which constitutes the cap does not vary excessively between the region in which the engaging element is located and adjacent regions.

In one embodiment, the projecting element is an annular sealing element which from the transversal wall projects inwards towards the inside of the cup-shaped body for sealingly engaging with the neck of the container. Providing a recess on the outer surface of the cup-shaped body at the annular sealing element avoids having a thickening of the cup-shaped body in the region in which the annular sealing element is located. In this way, the density of the material which constitutes the cap does not vary excessively between the region in which the annular sealing element is located and adjacent regions.

In a second aspect of the invention, there is provided a method for producing a cap, the cap comprising a cup-shaped body inside which a cavity is defined, the cup-shaped body being delimited by an inner surface facing towards the cavity and by an outer surface facing the opposite way to the cavity, wherein the cap is produced during a step of pressing a material at least part of which is derived from natural fibres, the pressing step comprising forming at least one projecting element on a surface of the cup-shaped body selected from either the inner surface or the outer surface, and forming at least one recess at said at least one projecting element, on another surface of the cup-shaped body selected from either the outer surface or the inner surface, thereby minimising the differences in compaction between separate zones of the cup-shaped body.

In one embodiment, the material which is pressed to produce the cap is a dry material, for example in the form or powder or granules.

In an alternative embodiment, the material which is pressed to produce the cap is in a pasty form.

The material which is pressed to produce the cap may also be in the form of a solid film, or in a "fluff" type of form.

The material at least part of which is derived from natural fibres may comprise cellulose.

Owing to the method provided according to the second aspect of the invention, it is possible to obtain a cap having a low environmental impact in a simple way.

The invention can be better understood and implemented with reference to the accompanying drawings, which illustrate some example, non-limiting embodiments of it, in which:

FIG. 6 is a perspective view of the cap of FIG. 5;

FIG. 7 is a perspective view of a cap according to another alternative embodiment;

FIG. 8 is a perspective view of the cap of FIG. 7, showing the inner part of the cap;

Figures 1, 2:
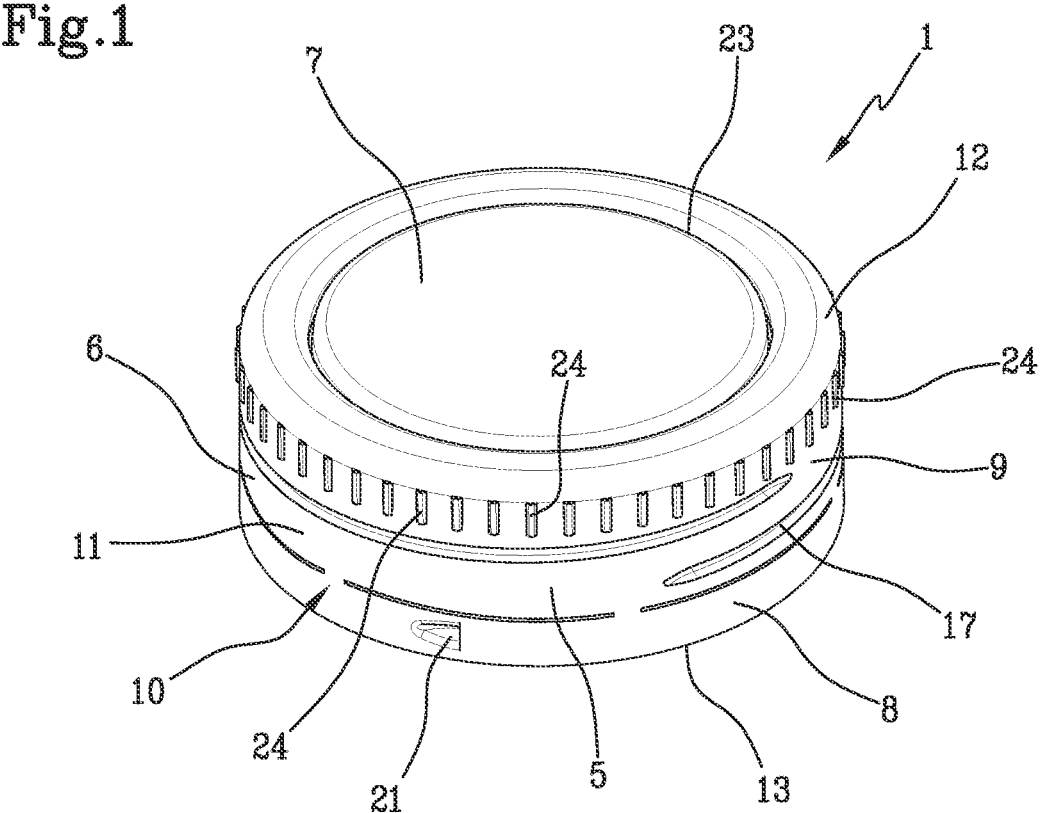
FIG. 1 is a perspective view of a cap for a container.
FIG. 2 is a perspective view of the cap of FIG. 1, showing the inside of the cap.

FIGS. 1 to 4 show a cap 1 intended to be applied to a container, for example a bottle, or a jar, or a pot or the like. The cap 1 is made of a material at least part of which is derived from natural fibres. The part of material derived from natural fibres may be cellulose, which is derived from wood fibres.

The material used to make the cap 1 may comprise a material derived from natural fibres, to which additives such as dyes, adhesives, lubricants and others have been added if necessary. Alternatively, the material used to make the cap 1 may comprise a material derived from natural fibres, mixed with a natural or synthetic polymeric material.

The cap 1 comprises a cup-shaped body 2, inside which a cavity 3 is defined. The cup-shaped body 2 has an inner surface 4, facing the cavity 3 so as to delimit the cavity 3, and an outer surface 5, facing outwards from the cup-shaped body 2, that is to say facing away from the cavity 3. The cup-shaped body 2 comprises a skirt 6, which extends around an axis Z. In the example shown, the skirt 6 has a substantially cylindrical shape.

The cup-shaped body 2 further comprises a transversal wall 7, which extends transversally, in particular perpendicularly, to the axis Z, at one end of the skirt 6. The transversal wall 7 may have a circular shape, if seen in plan view. The transversal wall 7 may be substantially flat, but this condition is not necessary.

An intended separating line 10 is provided on the skirt 6 to define an annular band 8 and a closing element 9. The closing element 9 comprises the transversal wall 7 and a lateral wall 11 which extends around the axis Z. The lateral wall 11 is joined to the transversal wall 7 in a joining zone 12. The lateral wall 11 is a portion of the skirt 6 interposed between the transversal wall 7 and the intended separating line 10.

The annular band 8 is a further portion of the skirt 6 and extends between the intended separating line 10 and a free edge 13 of the skirt 6.

The intended separating line 10 may be parallel to the free edge 13 of the skirt 6. More generally, the intended separating line 10 may extend in a plane perpendicular to the axis Z.

Before the cap 1 is applied on the neck of the container, the closing element 9 is joined to the annular band 8 along the intended separating line 10. When the cap 1 is opened for the first time, the closing element 9 separates from the annular band 8 along the intended separating line 10.

The closing element 9 may be removed from the container and subsequently re-applied on the related neck, whilst the annular band 8 remains anchored to the neck of the container after opening.

The intended separating line 10 may comprise a plurality of breakable elements 14, which are separated from each other by interrupting segments 15 at which material is not present. The interrupting segments 15 may be cut segments obtained by cutting the skirt 6 after the cup-shaped body 2 has been formed. In this way, a breakable element 14 remains defined between two consecutive cut segments. Alternatively, the interrupting segments 15 may be obtained while the cap 1 is formed, in the same mould in which the cap 1 is shaped.

The breakable elements 14 are intended to be broken the first time the closing element 9 is removed from the container to be brought into an open position.

Figure 4:
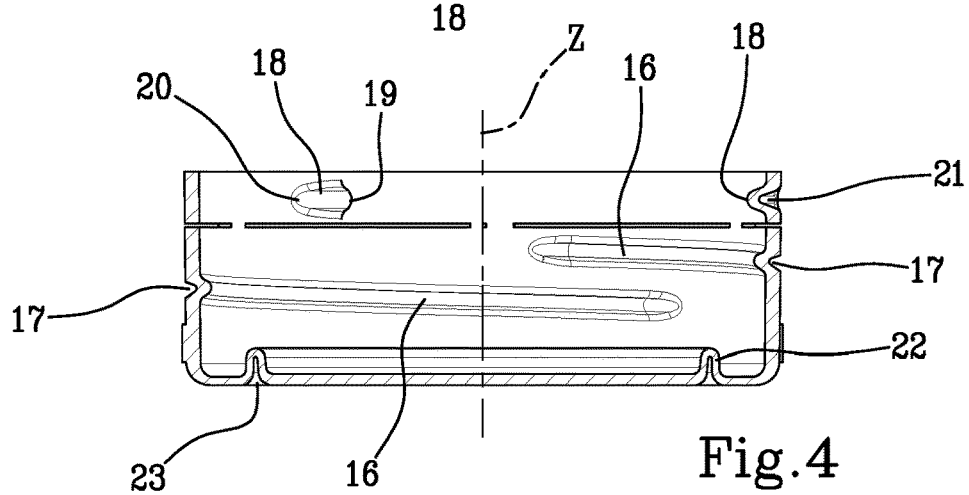
FIG. 4 is a cross-section along the plane IV-IV of FIG. 3.

As shown in FIGS. 2 and 4, the lateral wall 11 has at least one fastening element 16 to allow the closing element 9 to be repeatedly fixed to the container and removed from the latter.

The fastening element 16 has the shape of a projecting element which from the inner surface 4 projects inwards towards the inside of the cup-shaped body 2, that is to say, towards the cavity 3. In the example shown, the fastening element 16 is a screw thread suitable for engaging with a corresponding thread made on the neck of the container.

On the lateral wall 11 there may be a plurality of fastening elements 16, as in the example shown, in which there are two screw threads. Alternatively, on the lateral wall 11 there may be a single fastening element 16, for example a single screw thread having an angular extent greater than the screw threads shown.

On the outer surface 5 of the cup-shaped body 2, at the fastening element 16 or at each fastening element 16, there is a hollow 17, that is to say, a recess which penetrates towards the inside of the cup-shaped body 2.

The hollow 17 has a geometry which copies the geometry of the fastening element 16. In the example shown, in cui which the fastening element 16 is a screw thread, the hollow 17 has a helical shape.

The hollow 17 allows a reduction in the thickness of the lateral wall 11 at the fastening element 16, compared to the case in which the outer surface 5 were a smooth cylinder, that is to say, the hollow 17 were not present.

In one embodiment, owing to the hollow 17, the thickness of the lateral wall 11 in the region in which the fastening element 16 is present may be substantially constant.

The number of hollows 17 is equal to the number of fastening elements 16. In the example shown, in which there are two fastening elements 16, the lateral wall 11 has two hollows 17.

The annular band 8 may comprise at least one engaging element 18 suitable for engaging with a retaining element provided on the container. The retaining element is intended to keep the annular band 8 anchored to the container, preventing the annular band 8 from being able to be separated from the container when the closing element 9 is removed.

Each engaging element 18 is shaped like a projecting element which projects inwards towards the inside of the cup-shaped body 2 from the annular band 8. In the example shown, each engaging element 18 has an abutting front surface 19, which may be substantially flat, suitable for abutting against a stop surface of the retaining element to prevent the annular band 8 from rotating further when the closing element 9 is unscrewed. The abutting front surface 19 may extend in a radial plane, that is to say, in a plane containing the axis Z.

The engaging element 18 also has a rounded rear end 20.

The engaging element 18 projects from the inner surface 4 by an amount which gradually decreases from the abutting front surface 19 to the rear end 20.

The engaging element 18 may extend along a central line which lies in a plane perpendicular to the axis Z.

However, other geometries of the engaging element 18 are possible.

Figure 3:
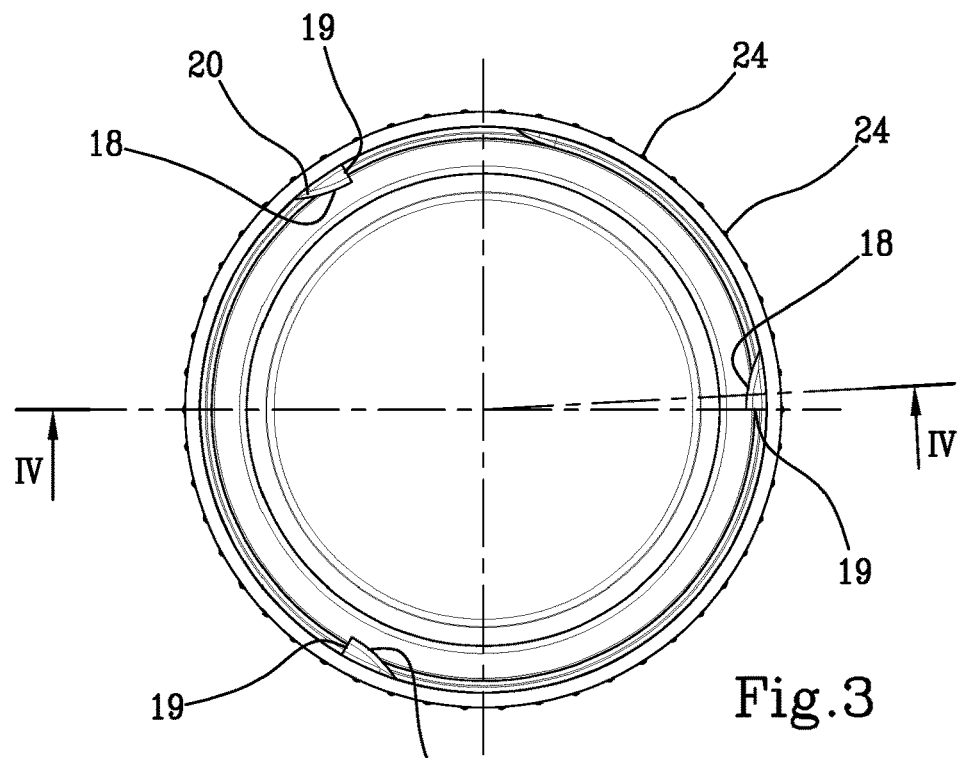
FIG. 3 is a bottom view of the cap of FIG. 1.

In the example shown, as shown in FIG. 3, there are three engaging elements 18, but the number of engaging elements 18 may be selected according to the particular type of container and the characteristics of the cap which must be applied to the container.

On the outer surface 5 of the cup-shaped body 2, at the engaging element 18 or at each engaging element 18, there is an indentation 21, that is to say, a recess, which penetrates towards the inside of the annular band 8. The indentation 21 may have a shape similar to that of the engaging element 18. The indentation 21 allows a reduction in the thickness of the annular band 8 at the engaging element 18 compared to the thickness that the annular band 8 would have if the indentation 21 were not present.

Owing to the indentation 21, the thickness of the annular band 8 at the engaging element 18 may be substantially equal to, or in any case not too dissimilar from, the thickness of the annular band 8 outside of the engaging element 18.

Made on the transversal wall 7 there is an annular sealing element 22 which projects from the inner surface 4 towards the cavity 3, that is to say, inwards towards the inside of the cup-shaped body 2.

The annular sealing element 22 is suitable for engaging with the container, in particular with an edge region of the neck of the container, so that the closing element 9 can close the container in a substantially sealed fashion.

In the example shown, the annular sealing element 22 is suitable for penetrating inside the neck of the container to make contact with an inner surface of the neck. In an alternative embodiment not shown, the annular sealing element 22 could be sized in such a way as to surround an edge of the neck of the container from the outside, so that it makes contact with an outer surface of the neck, near the rim of the latter.

There may also be more than one annular sealing element on the transversal wall 7.

In plan view, the annular sealing element 22, is shaped as a circular protuberance having a centre on the axis Z.

In a plane containing the axis Z, the annular sealing element 22 may have a cross-section which is "U"-shaped or "V"-shaped with a rounded vertex, with walls which are not necessarily symmetrical. In this way, the annular sealing element 22 may be easily produced in a mould and extracted from the latter, since it is free of undercuts.

On the outer surface 5 of the cup-shaped body 2, more precisely on the transversal wall 7, there is an annular groove 23 which penetrates towards the inside of the cup-shaped body 2. The annular groove 23 has the shape of a recess positioned at the annular sealing element 22.

The annular groove 23 has a geometry corresponding to the shape of the annular sealing element 22. In the example shown, the annular groove 23 is shaped like a circular groove centred on the axis Z.

At the annular groove 23, the material of the transversal wall 7 projects inwards towards the inside of the cup-shaped body 2 thereby defining the annular sealing element 22.

Owing to the annular groove 23, the annular sealing element 22 is shaped like a corrugation which extends towards the cavity 3.

The annular groove 23 prevents the creation of a thickening of the transversal wall 7 at the annular sealing element 22. In this way, it is possible to make the thickness of the transversal wall 7 more uniform even near the annular groove 23.

That does not mean that the thickness of the transversal wall 7 must be constant. In contrast, in the example shown, as shown in FIG. 4, in a central region thereof surrounded by the annular sealing element 22, the transversal wall 7 is thicker than the transversal wall 7 outside the annular sealing element 22. This makes the central part of the transversal wall 7 stiffer, reducing the risk that the transversal wall 7 can swell outwards from the cup-shaped body 2 or bend inwards towards the inside of the latter.

The cap 1 may also comprise a plurality of gripping ribs 24, provided on the outer surface 5 to allow a user to more securely grasp the closing element 9, reducing the risk that the closing element 9 will slip whilst the user is handling it. The gripping ribs 24 also improve the grip on the cap 1 on a capping machine.

The gripping ribs 24 may be provided on the lateral wall 11, near the joining zone 12. The gripping ribs 24 may in particular be interposed between the transversal wall 7 and the hollows 17, so that they do not interfere with the hollows 17.

The gripping ribs 24 may be shaped like projecting lines which project outwards from the outer surface 5 of the cup-shaped body 2. In the example shown, the gripping ribs 24 project by a limited amount from outer surface 5. In this case, there are no recesses on the inner surface 4 at the gripping ribs 24.

In an alternative embodiment not shown, on the inner surface 4 of the cup-shaped body 2 there may be recesses, in particular shaped like furrows, at the gripping ribs 24, to prevent the lateral wall 11 from having an excessive thickness at the gripping ribs 24.

The gripping ribs 24 may be straight and extend parallel to the axis Z.

The cap 1 is formed starting from a material at least part of which is derived from natural fibres, in the dry form (powder or granules), or in the pasty form, or also in the form of a solid film or in the form of a fluff. If the material used to form the cap is in the pasty form, it may be obtained by adding water or another liquid to a dry material. The material at least part of which is derived from natural fibres is introduced into a mould comprising a male mould-part and a female mould-part and compacted between the male part and the female part, which are moved one towards the other. The female part and/or the male part may comprise movable components which are movable to vary the volume of a forming chamber defined between the female part and the male part.

In this way, the cup-shaped body 2 is obtained, by compression moulding. As already described, the outer surface 5 is shaped in such a way as to substantially copy the three-dimensional profile of the inner surface 4. For that purpose, the outer surface 5 is provided with recesses at the main projecting elements which project from the inner surface 4. The recesses of the outer surface 5 may comprise the hollows 17, and/or the indentations 21 and/or the annular groove 23. That allows the obtainment of the most uniform possible distribution of the density of the material at least part of which is derived from natural fibres in the cup-shaped body 2. In particular, by avoiding excessive thicknesses of the cup-shaped body 2 in the positions in which the projecting elements which project from the inner surface 4 are located, it is possible to minimise or eliminate the variations in density between the zones of the cup-shaped body 2 in which there are projecting elements on the inner surface 4, and the further zones of the cup-shaped body 2 in which there are no projecting elements on the outer surface 4.

Consequently, the properties of the cap 1 are optimised.

Figure 5:
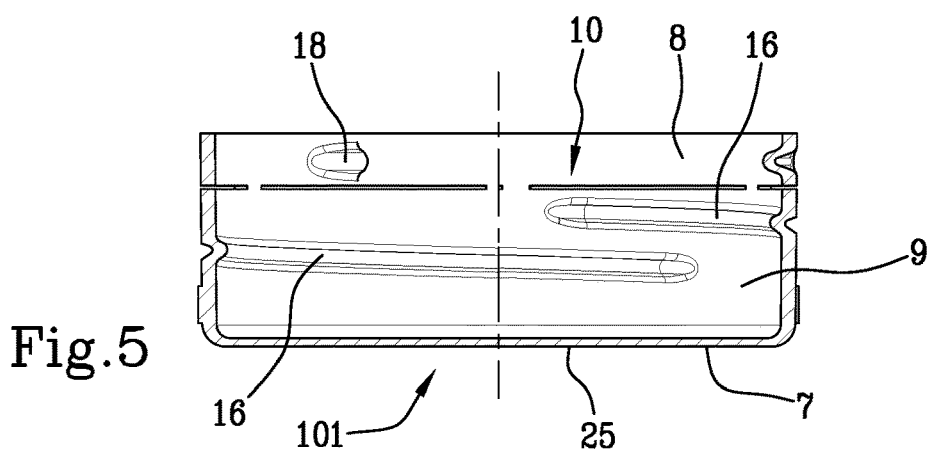
FIG. 5 is a cross-section like that of FIG. 4, showing a cap according to an alternative embodiment.

FIGS. 5 and 6 show a cap 101 according to an alternative embodiment. The cap 101 differs from the cap 1 shown in FIGS. 1 to 4 mainly because it does not comprise the annular sealing element 22. Consequently, the transversal wall 7 may be free of recesses on its outer face 25 facing outwards from the cup-shaped body 2, that is to say, facing the opposite way to the cavity 4. That is to say, there is no annular groove 23. In this case, the transversal wall 7 may have a substantially constant thickness.

The cap 101 may be used to close containers for which a hermetic seal is not essential, for example containers intended to contain substances which are not liquids and/or not foodstuffs.

Alternatively, the cap 101 may exert a sealing action using additional sealing elements not shown, for example a seal applied on an inner face of the transversal wall 7.

Figure 9:
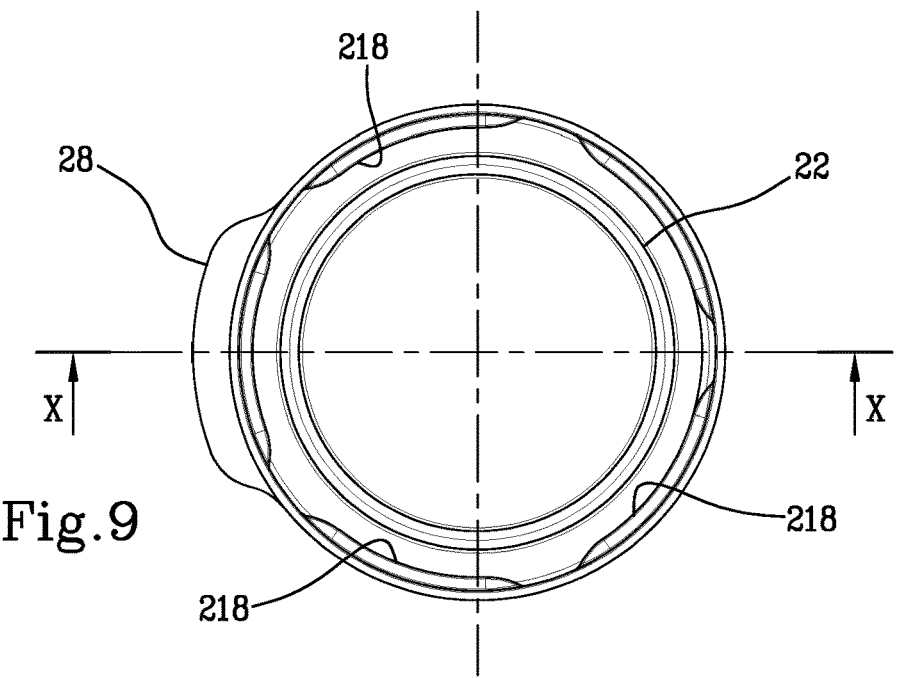
FIG. 9 is a bottom view of the cap of FIG. 7.

Whilst FIGS. 1 to 6 related to a screw cap, FIGS. 7 to 9 show a different type of cap 201, more precisely a so-called "snap-on" cap intended to be applied using pressure on a neck of a container.

The cap 201 comprises the cup-shaped body 2 on whose skirt 6 the intended separating line 10 is made, the intended separating line 10 defining the annular band 8 and the closing element 9, as already described with reference to FIGS. 1 to 6. Along the intended separating line 10 there may be a plurality of breakable elements 14, intended to be broken the first time the closing element 9 is brought into an open position. However, unlike what happened in FIGS. 1 to 6, the intended separating line 10 is circumferentially interrupted, so as to leave a connecting portion 26 which connects the closing element 9 to the annular band 8. Owing to the connecting portion 26, when the closing element 9 is brought into an open position, the closing element 9 remains attached to the annular band 8 and cannot be separated from the container to which the cap 201 is applied.

The connecting portion 26 defines a hinge around which the closing element 9 can rotate to be brought into the open position.

At the connecting portion 26, on the skirt 6 there may be a recessed portion of wall 27 which penetrates towards the inside of the cup-shaped body 2 from outer surface 5. The recessed portion of wall 27 may extend at least from the connecting portion 26 as far as the transversal wall 7.

The recessed portion of wall 27 allows the intended separating line 10 to be made more easily. If the latter is made using a cutting tool, the cutting tool may interact with the cap 201 over an angular extent of 360° around the axis Z. That is to say, there is no need for the cutting tool to operate in a way adjusted to the skirt 6, or interact with the skirt 6 only for a limited angular extent of the latter. The cutting tool does not cut the skirt 6 at the connecting portion 26, since it does not succeed in touching the material of the skirt 6 at the recessed portion of wall 27, which is closer to the axis Z than the regions of the skirt 6 adjacent to it.

Figure 10:
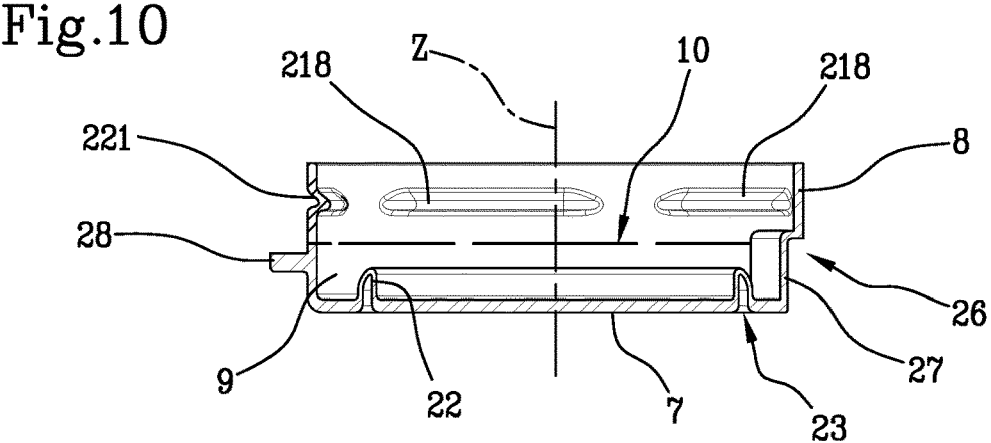
FIG. 10 is a cross-section along the plane X-X of FIG. 9.

At the recessed portion of wall 27, the lateral wall 11 of the closing element 9 projects towards the cavity 3, as shown in FIG. 10.

Provided on the transversal wall 7 is the annular sealing element 22, which from the inner surface 4 projects inwards towards the inside of the cup-shaped body 2, that is to say, towards the cavity 3, as was the case in the cap 1.

At the annular sealing element 22, on the transversal wall 7 is the annular groove 23, which penetrates in the thickness of the transversal wall 7 on the outer surface 5, as already described with reference to FIGS. 1 to 4. As well as having a sealing function, the annular sealing element 22 allows the closing element 9 to be kept in a closed position, by engaging with the neck of the container, in particular with an inner surface of the neck of the container. That is to say, the closing element 9 may remain in the closed position owing to the interference which is generated between the annular sealing element 22 and the neck of the container.

It should be noticed that, in the cap 201, there are no screw threads on the lateral wall 11.

The closing element 9 has a gripping tab 28 which projects outwards from the lateral wall 11. The gripping tab 28 extends transversally, in particular perpendicularly, to the axis Z. The gripping tab 28 may have a flat geometry.

The gripping tab 28 is provided in a position diametrically opposite to the connecting portion 26.

The user can act on the gripping tab 28, in particular on a lower surface of the latter, to more easily bring the closing element 9 into the open position. The user can also act on the gripping tab 28, in particular on an upper surface of the latter, to return the closing element 9 to the closed position. The annular band 8 is provided with a plurality of engaging elements 218 shaped like projecting elements, which from the inner surface 4 project towards the cavity 3, that is to say, inwards towards the inside of the cup-shaped body 2. The engaging elements 218 are intended to engage with at least one retaining element provided on the neck of the container and suitable for preventing the annular band 8 from being able to be removed from the neck. The retaining element may for example comprise an annular enlargement which projects outwards from the neck of the container.

Similarly to what was described with reference to FIGS. 1 to 7, on the outer surface 5 of the cup-shaped body 2 there is a plurality of indentations 221, each indentation 221 being located at a respective engaging element 218. The indentations 221 have a shape corresponding to the shape of the engaging elements 218.

That allows the thickness of the annular band 8 at the engaging elements 218 to be kept limited and consequently improves the uniformity of density of the cap 201.

The engaging elements 218 are functionally similar to the engaging elements 18 described with reference to the caps of FIGS. 1 to 6, from which they differ in shape. In particular, the engaging elements 218 have the shape of circular arcs and extend along respective central lines lying in a plane positioned transversally, in particular perpendicularly, to the axis Z. Each engaging element 218 may have two rounded ends. The height of each engaging element 218 measured parallel to the axis Z may be constant at least in a central zone of the engaging element 218.

In one embodiment not shown, on the inner surface 4 there may be one or more fastening elements which project from the closing element 9 inwards towards the inside of the cup-shaped body 2, to more easily keep the closing element 9 in the closed position. The fastening elements may be shaped like elements projecting towards the cavity 3, not necessarily having the geometry of a screw thread. The fastening elements are intended to engage with a corresponding fixing arrangement provided on the neck of the container. On the outer surface 5 of the cup-shaped body 2, at each fastening element, in this case there is a hollow or recess which penetrates towards the inside of the cup-shaped body 2, for the reasons previously described with reference to FIGS. 1 to 6.

Figure 11:
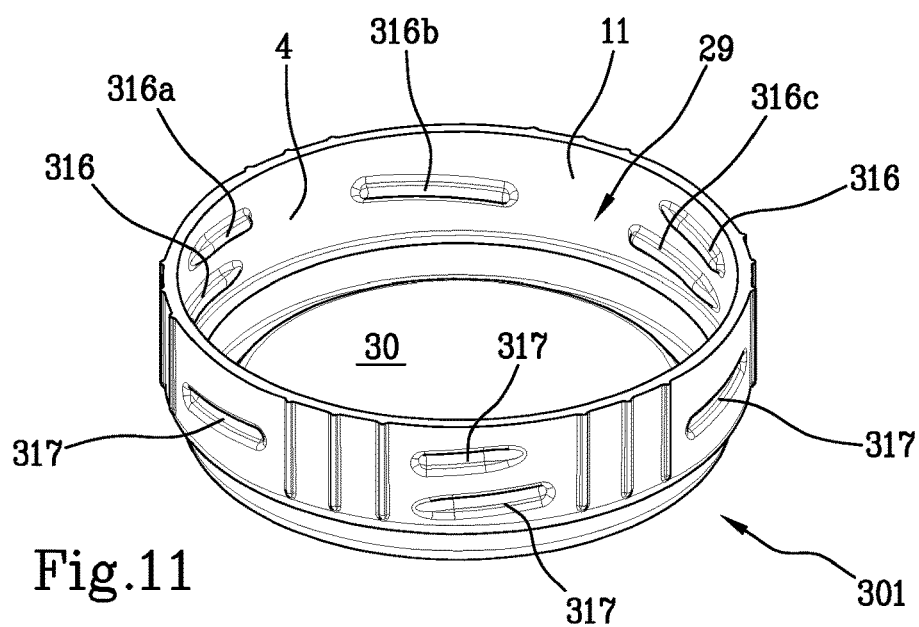
FIG. 11 is a perspective view of a cap according to a further alternative embodiment.
Figure 13:
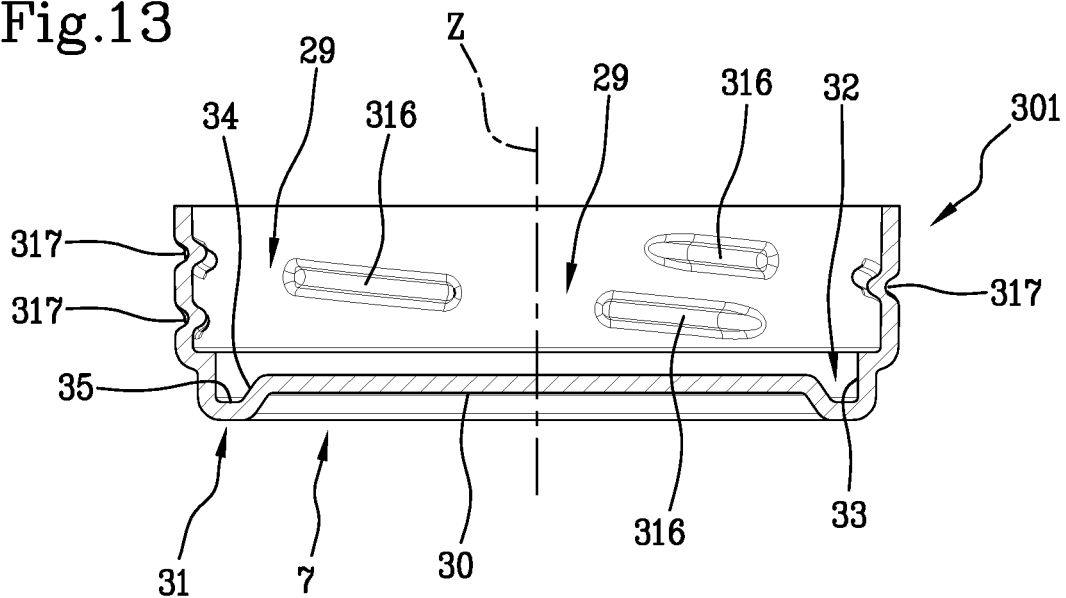
FIG. 13 is a cross-section along the plane XIII-XIII of FIG. 12.
Figure 12:
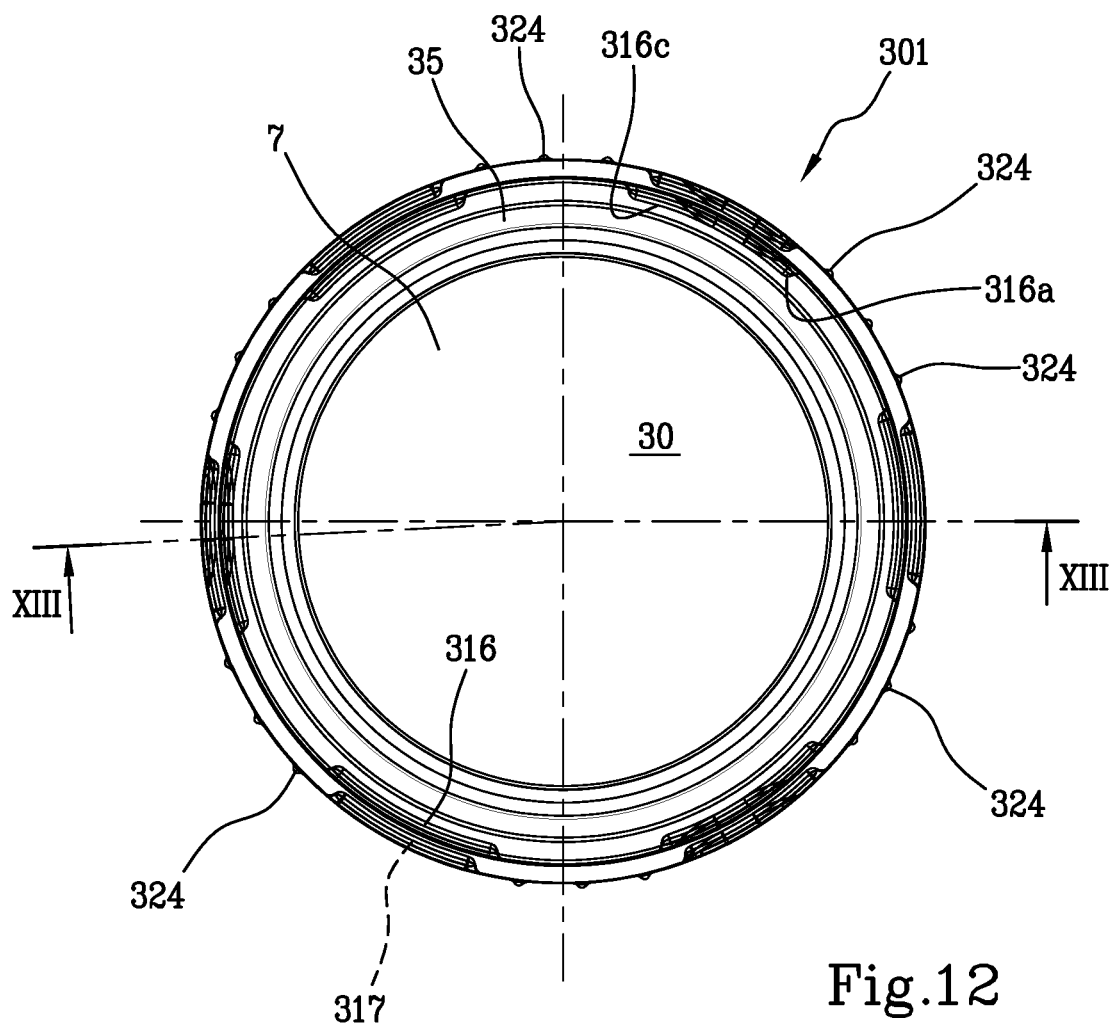
FIG. 12 is a bottom view of the cap of FIG. 11.

FIGS. 11 to 13 show a cap 301 according to an alternative embodiment. The cap 301 is particularly suitable for closing containers which have a wide mouth, such as jars or pots.

Similarly to the caps 1 and 101 shown in FIGS. 1 to 6, the cap 301 is a screw cap. However, the cap 301 does not comprise an annular band intended to remain anchored to a container neck. When the cap 301 is brought into an open position, the whole cap 301 is removed from the neck of the container.

On the lateral wall 11, the cap 301 is provided with a plurality of fastening elements 316 each of which is shaped like a projecting element which from the inner surface 4 projects inwards towards the inside of the cup-shaped body 2. Each fastening element 316 has the shape of a portion of screw thread. There is a plurality of fastening elements 316, which belong to the same screw thread and are separated by thread-free spaces or gaps 29. The thread-free gaps 29 correspond to smooth portions of the inner surface 4. In the example shown, the cap 301 comprises three fastening elements 316a, 316b, 316c belonging to the same screw thread, that is to say, positioned in sequence along the same helix which is wrapped around the axis Z. More specifically, an initial portion of screw thread, which during screwing is the first to engage with a corresponding thread of the container, is defined by the fastening element 316a. A final portion of screw thread, which during screwing is the last to engage with the corresponding thread of the container, is defined by the fastening element 316c. An intermediate portion of screw thread is defined by the fastening element 316b, interposed between the fastening elements 316a and 316c.

The fastening elements 316 present on the inner surface 4 may belong to multiple screw threads. In the example shown, there are three screw threads, distributed around the axis Z at an angular distance of 120* from each other. Each screw thread comprises a plurality of portions of thread (in the example shown, three portions of thread each of which is defined by respective fastening elements 316a, 316b, 316c).

Fastening elements 316 belonging to different threads may be aligned along a direction parallel to the axis Z. In the example shown, the fastening element 316a corresponding to an initial portion of thread is aligned, along a direction parallel to the axis Z, with the fastening element 316c corresponding to a final portion of an adjacent thread. In other words, there is at least one plane containing the axis Z which intersects both the fastening element 316a corresponding to an initial portion of thread, and the fastening element 316c corresponding to a final portion of an adjacent thread.

In the thread-free gaps 29, the fastening elements 316 are not present.

At the fastening elements 316, on the outer surface 5 of the cup-shaped body 2, there are recesses or hollows 317, which penetrate towards the inside of the lateral wall 11. The hollows 317 have a geometry similar to that of the fastening elements 316, that is to say, they are shaped like furrows which extend along a helix positioned around the axis Z.

The hollows 317 allow a reduction in the thickness of the lateral wall 11 at the fastening elements 316 and therefore compacting of the material which forms the cap 301 with a substantially uniform density, even in the zones in which the fastening elements 316 are present.

On the outer surface 5 of the cup-shaped body 2, at the thread-free gaps 29, there are gripping ribs 324 which project outwards from the lateral wall 11. Each gripping rib 324 extends in a direction parallel to the axis Z.

The gripping ribs 324 allow a user to securely grasp the cap 301 to screw it onto the container and unscrew it from the latter, preventing the cap 301 from slipping in the hands of the user. Moreover, the gripping ribs 324 make it easier for the cap 301 to be grasped on a capping machine.

In the example shown, there are groups of three gripping ribs 324 in each thread-free gap 29, but this feature is not necessary and in each thread-free gap 29 there could be a number of gripping ribs 324 other than three. In the regions of the lateral wall 11 interposed between two consecutive thread-free gaps 29 there are no gripping ribs 324. Otherwise, the gripping ribs 324 provided in the regions interposed between two thread-free gaps 29 would interfere with the hollows 317.

On the inner surface 4 of the cup-shaped body 2 there are no recesses at the gripping ribs 324 because, in the example shown, the gripping ribs 324 project by a limited amount from a cylindrical outer surface of the lateral wall 11. The increase in the thickness of the lateral wall 11 caused by the gripping ribs 324 is limited and does not negatively affect the cap 301.

If the gripping ribs 324 were to project further from the lateral wall 11, on the inner surface 4 there could be recesses, in particular shaped like furrows, at the gripping ribs 324, so as to prevent excessive increases in the thickness of the lateral wall 11 at the gripping ribs 324 and to favour the most uniform possible compacting of the material of which the cap 301 is made.

The transversal wall 7 of the cap 301 comprises a central panel 30 surrounded by a circular projection 31 which projects outwards from the cap 301. In plan view, the central panel 30 has a circular shape concentric with the axis Z. The circular projection 31 is concentric with the central panel 30.

On the inner surface 4 of the cup-shaped body 2, at the circular projection 31, there is an annular seat 32, shaped like a recess, suitable for receiving a rim of the container to which the cap 301 is intended to be applied.

The annular seat 32 is delimited by an outer lateral surface 33 and by an inner lateral surface 34 which are facing each other. In the example shown, the inner lateral surface 34 is a surface tilted relative to the axis Z, whilst the outer lateral surface 33 is a cylindrical surface which extends parallel to the axis Z.

The inner lateral surface 34 and/or the outer lateral surface 33 may engage with the rim of the container, respectively on the inside and on the outside of the latter, to prevent a product contained in the container from coming out.

Interposed between the inner lateral surface 34 and the outer lateral surface 33 there may be an end surface 35 which extends transversally, in particular perpendicularly, to the axis Z. In the example shown, the end surface 35 is flat.

Since the annular seat 32 is provided at the circular projection 31, the thickness of the transversal wall 7 does not undergo large variations, which allows the density of the cap 301 to be kept substantially uniform.

In the examples shown, gripping elements have been described comprising the gripping ribs 24 or 324, which extend in a direction parallel to the axis Z. In an alternative embodiment, the gripping elements may be shaped like gripping ribs extending obliquely relative to the axis Z. It is also possible to use gripping elements having a shape different from the gripping ribs, for example shaped like local protuberances which occupy a limited portion of the height of the skirt.

The gripping elements may project outwards from the skirt, or they may penetrate towards the inside of the skirt. In both cases, the gripping elements create surface irregularities which make it easier to grasp the cap.

If the gripping elements project outwards from the skirt, then on the inner surface of the cup-shaped body there may be recesses at the gripping elements. In contrast, if the gripping elements penetrate towards the inside of the skirt from the outer surface of the cup-shaped body, then on the inner surface of the cup-shaped body there may be projecting elements at the gripping elements.

The caps described above may exert a sealing action, when they engage with the neck of the container, owing to additional sealing elements not shown, for example a seal applied on an inner face of the transversal wall 7.

The seal may be made of a material at least part of which is derived from natural fibres, for example the same material used to make the cup-shaped body 2. Alternatively, the seal may be made of a synthetic polymeric material. The seal may have the shape of a round disk, or it may be ring-shaped. In general, the seal is made of a material suitable for exerting a sealing action when it engages with the neck of the container. The material of the seal may be a material which is softer than the material used to make the cup-shaped body 2.

The invention claimed is:

1. A cap for a container, the cap being made of a material at least part of which is derived from natural fibres, the cap comprising a cup-shaped body having a skirt which extends around an axis and a transversal wall arranged transversally to the axis, a cavity being defined inside the cup-shaped body, the cup-shaped body being delimited by an inner surface facing the cavity and by an outer surface facing the opposite way to the cavity, wherein at least one projecting element projects from the inner surface of the cup-shaped body, and wherein at least one recess is provided at said at least one projecting element on the outer surface of the cup-shaped body, the material and the natural fibres being uniformly compacted and the compaction of the material and the natural fibres results in the cap having a uniform density.

2. The cap according to claim 1, wherein said at least one projecting element comprises a fastening element which projects from the skirt inwards towards the inside of the cup-shaped body to removably fasten at least one part of the cap to a neck of the container, said at least one recess being provided at the fastening element on the outer surface.

3. The cap according to claim 2, wherein the fastening element comprises a screw thread, said at least one recess being provided on the outer surface at the screw thread and being shaped like a helical hollow.

4. The cap according to claim 1, and further comprising a plurality of gripping ribs made on the skirt to make the cap easier to grasp, the plurality of gripping ribs being provided in a region of the outer surface in which said at least one recess is not present.

5. The cap according to claim 4, wherein said at least one projecting element comprises a fastening element which projects from the skirt inwards towards the inside of the cup-shaped body to removably fasten at least one part of the cap to a neck of the container, said at least one recess being provided at the fastening element on the outer surface, and wherein the transversal wall is joined to the skirt in a joining zone, the plurality of gripping ribs being distributed along a region of the skirt interposed between the joining zone and the fastening element.

6. The cap according to claim 4, wherein said at least one projecting element comprises a fastening element which projects from the skirt inwards towards the inside of the cup-shaped body to removably fasten at least one part of the cap to a neck of the container, said at least one recess being provided at the fastening element on the outer surface, the fastening element comprising a screw thread, said at least one recess being provided on the outer surface at the screw thread and being shaped like a helical hollow, and wherein the screw thread comprises a plurality of portions of thread separated by thread-free gaps on the inner surface of the cup-shaped body, the gripping elements being provided on the outer surface in zones arranged at the thread-free gaps.

7. The cap according to claim 4, wherein each gripping rib of the plurality of gripping ribs is shaped like a projection or alternatively a recess provided on the outer surface.

8. The cap according to claim 1, wherein said at least one projecting element comprises an annular sealing element, which from the transversal wall projects inwards towards the inside of the cup-shaped body to sealingly engage with an edge region of a neck of the container, said at least one recess being an annular groove provided on the outer surface at the annular sealing element.

9. The cap according to claim 8, wherein the annular sealing element has, in a plane containing said axis a cross-section which is "U"-shaped or "V"-shaped with a rounded vertex.

10. The cap according to claim 1, wherein an intended separating line is provided on the skirt, the intended separating line extending around the axis and defining on the cup-shaped body a closing element and an annular band, said at least one projecting element comprising an engaging element which projects from the annular band to engage with a retaining element provided on a neck of the container and to prevent the annular band from being removed from the neck, said at least one recess being provided at the engaging element.

11. The cap according to claim 10, wherein the engaging element extends along a central line which lies in a plane perpendicular to the axis.

12. The cap according to claim 10, wherein the intended separating line is circumferentially interrupted around the axis so as to define a connecting portion along which the closing element remains joined to the annular band after having been brought into an open position.

13. The cap according to claim 1, wherein the part of material derived from natural fibres is cellulose.

14. The cap according to claim 1, wherein the transversal wall has an inner face, a seal being anchored to the inner face to engage with a neck of the container, the seal being made of a material which is softer than the material of the cup-shaped body.

15. The cap according to claim 14, wherein the seal is made of a material at least part of which is derived from natural fibres.

16. The cap according to claim 15, wherein the seal is made of the same material used to make the cup-shaped body.

17. A method for producing a cap, the cap comprising a cup-shaped body inside which a cavity is defined, the cup-shaped body being delimited by an inner surface facing towards the cavity and by an outer surface facing the opposite way to the cavity, wherein the cap is produced during a step of pressing a material at least part of which is derived from natural fibres, the step of pressing comprising forming at least one projecting element on a surface of the cup-shaped body selected from either the inner surface or the outer surface, and forming at least one recess on another surface of the cup-shaped body selected from either the outer surface or the inner surface at said at least one projecting element, thereby minimising the differences in compaction between distinct zones of the cup-shaped body.

18. The method according to claim 17, wherein the part of material derived from natural fibres comprises cellulose.

* * * * *